United States Patent [19]

Wolf

[11] Patent Number: 5,049,854

[45] Date of Patent: Sep. 17, 1991

[54] SENSING ELEMENT FOR AN ALARM SYSTEM

[76] Inventor: Adrian F. Wolf, P.O. Box 17, Liverpool, L37 1YE, England

[21] Appl. No.: 645,350

[22] Filed: Jan. 24, 1991

Related U.S. Application Data

[63] Continuation of Ser. No. 435,376, Mar. 8, 1990, abandoned.

[51] Int. Cl.$^5$ ............................................. G08B 13/00
[52] U.S. Cl. ........................................ 340/550; 109/42
[58] Field of Search .................... 340/550; 109/41-42; 160/10

[56] References Cited

U.S. PATENT DOCUMENTS

| | | | |
|---|---|---|---|
| 3,051,935 | 8/1962 | Willson | 340/550 |
| 4,146,293 | 3/1979 | Mutton et al. | 340/550 |
| 4,521,767 | 6/1985 | Bridge | 340/555 |

FOREIGN PATENT DOCUMENTS

| | | |
|---|---|---|
| 2441054 | 3/1976 | Fed. Rep. of Germany . |
| 2856819 | 7/1980 | Fed. Rep. of Germany ...... 340/550 |
| 2434436 | 4/1980 | France ................................. 340/550 |
| 1602744 | 11/1981 | United Kingdom . |
| 8808594 | 11/1988 | World Int. Prop. O. . |

Primary Examiner—Glen R. Swann, III
Assistant Examiner—Thomas J. Mullen, Jr.
Attorney, Agent, or Firm—Brown, Martin, Haller & McClain

[57] ABSTRACT

A sensing element (18) for use in an alarm system for protecting an area enclosed by flexible closure device (10). The element includes a plurality of conductors (16), at least one of which is a decoy conductor intended to prevent circumvention of the alarm system by short-circuiting or the like. The decoy conductor can be a dummy conductor carrying no current, or can be connected into an alarm circuit arranged to sense attempts to connect the decoy conductor to another conductor.

5 Claims, 2 Drawing Sheets

SENSING ELEMENT FOR AN ALARM SYSTEM

This is a continuation of application Ser. No. 07/435,376, filed Mar. 8, 1990, abandoned.

BACKGROUND OF THE INVENTION

This invention relates to a sensing element for an alarm system, and more particularly to a sensing element of the type which can be associated with a flexible closure to sense attempts of an unauthorised person to cut through or disturb the closure.

BRIEF DESCRIPTION OF THE PRIOR ART

There have been several proposals for alarm systems for flexible closures such as 'curtainsider' lorry sides; usually these systems are based upon a network of conductive sensing elements which are attached to or otherwise incorporated into the flexible closure and which form part of an alarm circuit carrying a small electric current. The network is so arranged that, if the closure is cut to any significant extent, the elements will be disturbed or broken. This causes the current to vary or to stop flowing altogether, a variation which can be used to trigger an alarm thereby preventing unauthorised access to the area enclosed by the closure means. In other alarm systems, the alarm can be triggered by 'making' a circuit between two normally unconnected sensing elements, the elements being deflected into contact with one another by disturbance or cutting, or being connected by a conductive cutting implement.

Although most known alarm systems provide a reasonable measure of protection, these systems can often be overcome by a determined and resourceful person. A major problem is that an unauthorised person can readily gain access to the sensing elements and tamper with them so that the system fails to trigger an alarm when other elements are subsequently cut or disturbed. In particular, certain sensing elements of the network can be connected to one another so that the current continues to flow steadily through the alarm circuit, thereby maintaining a non-alarm condition even when elements in other parts of the network are being cut or disturbed.

SUMMARY OF THE PRESENT INVENTION

An object of this invention is to provide an improved sensing element for an alarm system, which overcomes or mitigates the disadvantages of known sensing elements.

According to one aspect of this invention there is provided a sensing element for connection into an alarm system, the element including a plurality of conductors, wherein at least one of the conductors is a decoy conductor.

The decoy conductor may be a dummy conductor, or may be connected into an alarm device for sensing and alerting against attempts to tamper with the sensing elements. It is preferred that the conductors are braided, twisted or plaited together to form a wire, and the conductors are advantageously substantially identical in appearance to one another. Each conductor is preferably sheathed with insulating material before being formed into the wire, and the wire may itself be sheathed with insulating material. In preferred embodiments the sensing element also includes a flexible backing strip to which the wires are attached, the strip being for attachment to flexible closure means.

According to another aspect of this invention there is provided an alarm system for preventing unauthorised access to an area protected by flexible closure means, the system comprising a plurality of sensing elements for association with the closure means, wherein at least some of the elements each include at least two conductors and at least one of the condutors is a decoy conductor.

According to a further aspect of this invention there is provided a closure for use in an alarm system, the closure including a sheet having a plurality of sensing elements associated therewith for connection into an alarm system whereby disturbance of the sheet may be sensed, wherein at least some of the elements each include at least two conductors and at least one of the conductors is a decoy conductor.

BRIEF DESCRIPTION OF THE DRAWINGS

Embodiments of this invention will now be described; by way of example, with reference to the accompanying drawings in which.

DESCRIPTION OF THE PREFERRED EMBODIMENTS

Figure 1:
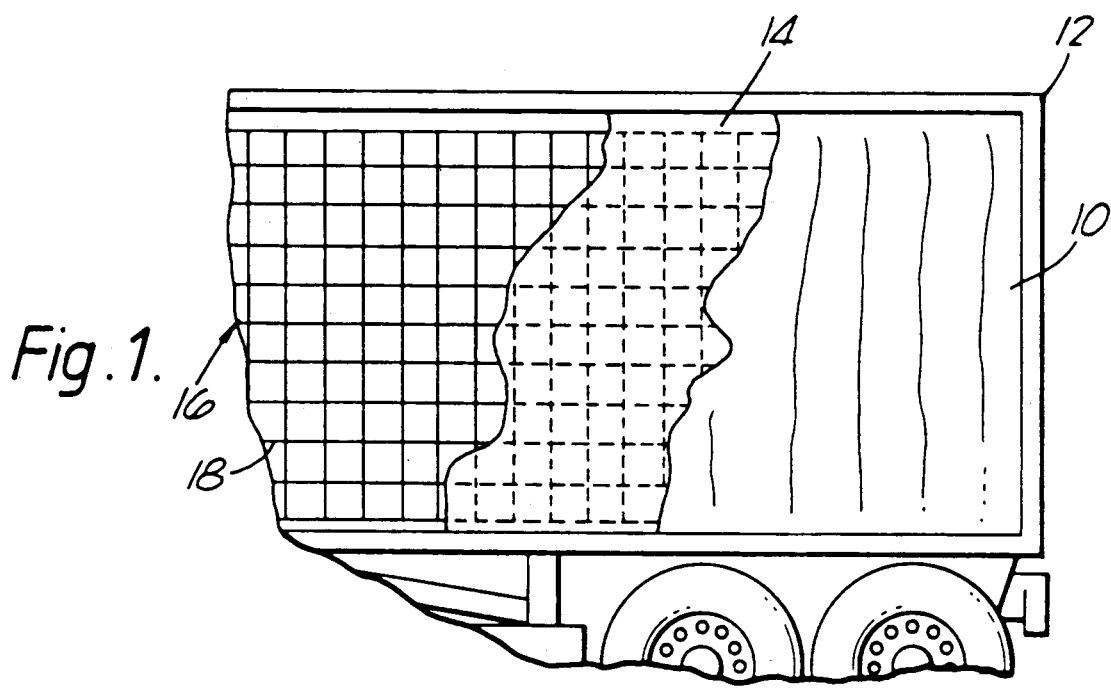
FIG. 1 is a part-sectioned elevational view illustrating aspects of an alarm system which can incorporate a sensing element according to this invention.

Referring to FIG. 1 of the drawings, an alarm system incorporating the sensing element of this invention is shown in relation to "curtainsider" goods vehicle, although this type of alarm system can be applied to any of a variety of flexible closures such as car hoods or boat covers as will be clear to those skilled in the art.

In FIG. 1, a flexible protective sheet 10 extends over substantially all of the area of the side openings defined by the vehicle's support structure 12. The sheet 10 is of the type conventionally used in a curtainsider vehicle, hanging as a curtain by its upper edge from the support structure 12 and being made of canvas, p.v.c., or other flexible sheeting material. A similarly-sized inner sheet 14, which can also be made of canvas; p.v.c. or the like, is bonded, welded or stitched to the inner surface of sheet 10 in such a position that sheet 10 completely overlays the inner sheet 14.

The inner sheet 14 carries a network 16 of closely-spaced conductive sensing elements 18 extending over substantially all of its area, the elements 18 preferably being stitched to the inner sheet 14 although they may be attached thereto by any suitable means such as adhesive or welding. The network 16 is arranged such that making a cut of significant length anywhere on sheet 10 will also cut sheet 14 thereby disturbing or breaking at least one sensing element 18. The network 16 carries a small electric current, and disturbing or breaking an element 18 varies this current which can be used to activate an alarm.

Further details of the alarm system outlined above are contained in the Applicants co-pending International Patent Application No. PCT/GB87/00289, published under number WO87/06749, details of which are incorporated herein by reference.

Figure 2:
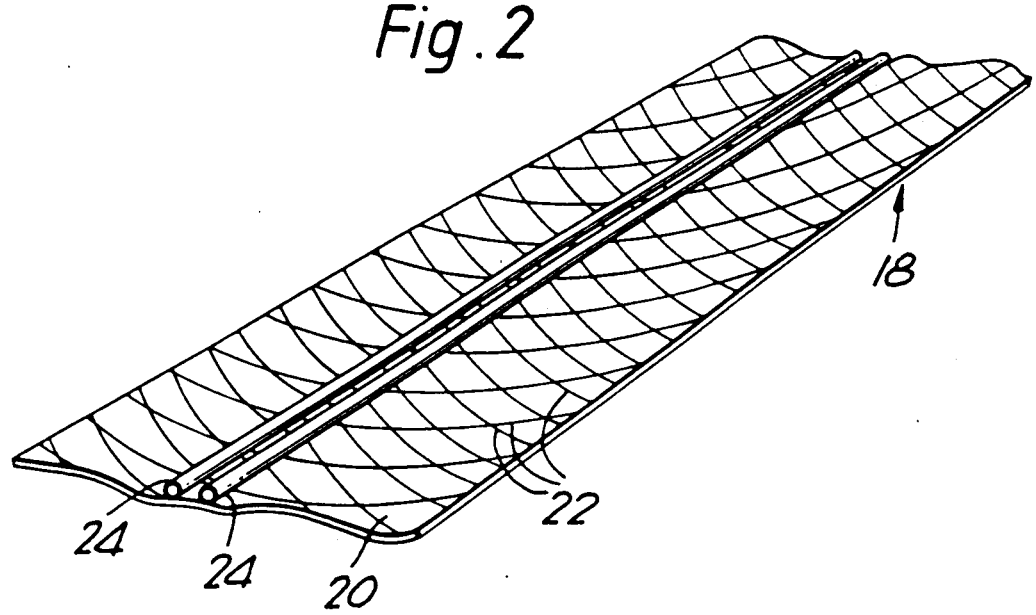
FIG. 2 is a perspective view showing a preferred embodiment of a sensing element according to this invention.

FIG. 2 of the drawings illustrates a preferred embodiment of sensing element 18, which comprises a backing strip 20 of p.v.c. or other suitable flexible material. Backing strip 20 is preferably reinforced with laminated crisscross nylon strands 22 as shown, and is suitably about 32 mm wide by about 0.30 mm thick although its dimensions can be chosen to suit any particular application.

Extending longitudinally along, and attached to, the central portion of one side of backing strip 20 are two insulated wires 24 which lie substantially parallel to and separate from one another. The wires 24 may be attached to the backing strip 20 by any suitable means such as bonding, welding or laminating. It is preferred that the wires 24 are connected to each other in series as part of the same electrical circuit, although the wires 24 could alternatively be connected in parallel or could belong to different electrical circuits.

In use, the sensing element 18 is bonded, welded, stitched or otherwise attached to the inner face of inner sheet 14, with the wires 24 facing the sheet 14 and with the points of attachment extending along the backing strip 20 on either side of the wires 24 such that the wires 24 are shrouded in a protective pocket between the backing strip 20 on either side of the wires 24 such lengths of the sensing element 18 can be arranged and attached to the inner sheet 14 so as to build up a network of elements as desired. The wires 24 associated with the various lengths of sensing element 18 can be connected together at their ends to form an electrical circuit for triggering an alarm in case of unauthorised tampering.

Figure 3:
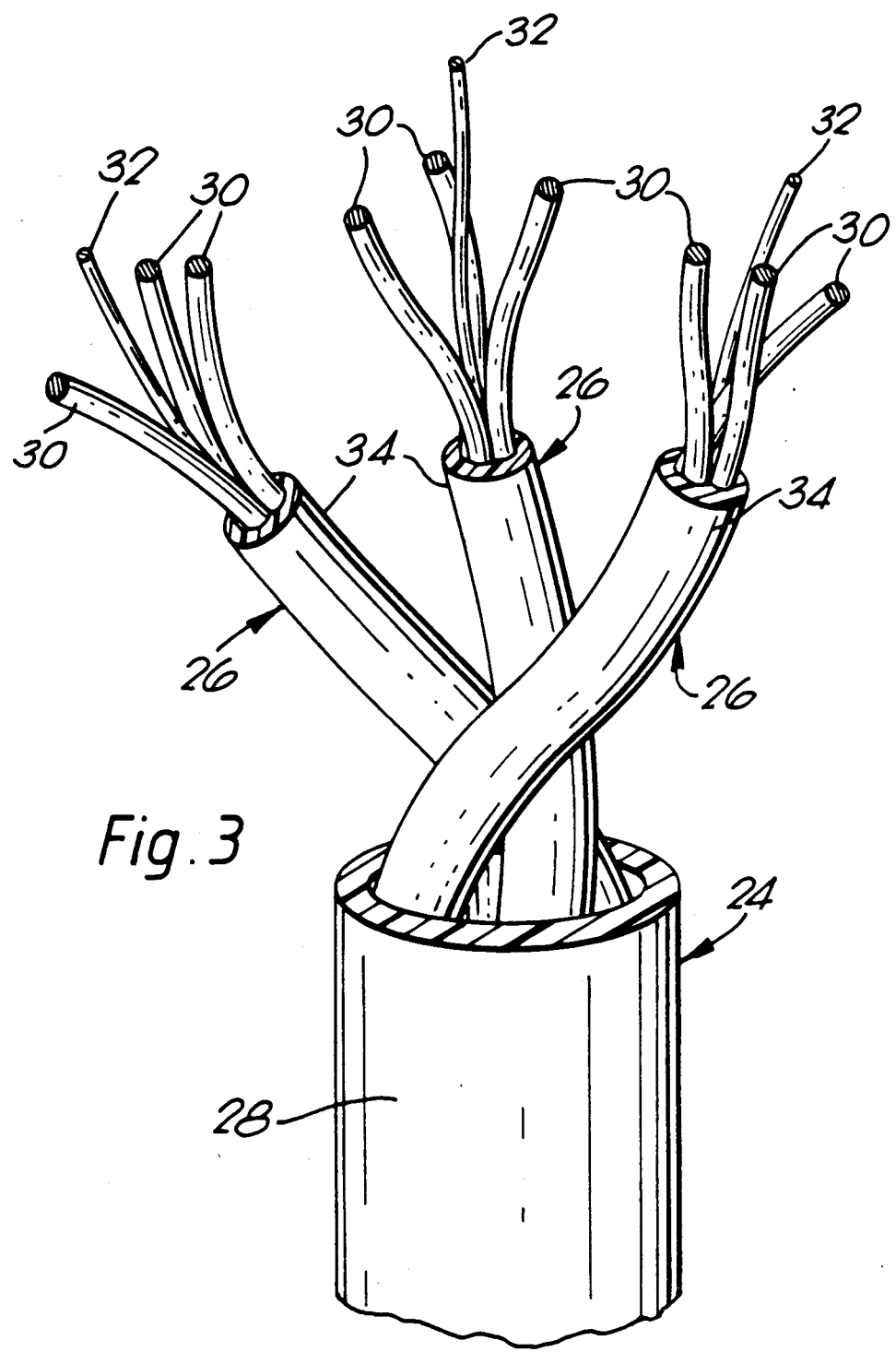
FIG. 3 is a part-sectioned detail view showing aspects of part of the sensing element shown in FIG. 2.

A preferred embodiment of wire 24 is illustrated in detail in FIG. 3 and includes three inner conductors 26 contained within an insulating outer sheath 28. Each inner conductor 26 is made up of three strands 30 of conductive tinsel wire twisted about a polyester or cotton thread 32 and is shrouded by an insulating inner sheath 34. The inner conductors 26 are plaited, twisted or braided together and are substantially identical in appearance to one another so that they cannot be distinguished between.

In one embodiment of this invention, at least one of the inner conductors 26 (A) is not part of the main alarm circuit but is instead a dummy carrying no current. Therefore, if an unauthorized intruder should make a connection to the dummy inner conductor A in an attempt to circumvent the alarm, the alarm will not be disabled because the remaining 'live' inner conductor (B) will be unaffected. If a large number of inner conductors 26 are employed, the intruder will find it difficult or impossible to pick out the live conductor(s) from the dummy conductors, which will delay and therefore help to deter the intruder. Moreover, as the number of inner conductors 26 increases it becomes more impractical for the intruder to make connections to all of the inner conductors 26 if he tries to ensure that he has made connections to the live inner conductors B.

In other embodiments, at least one of the inner conductors 26 (C) is again separate from the main alarm circuit, but instead of being a dummy the conductor is connected into a further alarm circuit. If an intruder should connect an inner conductor 26 from another sensing element 18 to conductor C, the voltage of, or current within conductor C will change. These effects can be positively sensed by the further alarm circuit so that any connection to conductor C triggers an alarm. One of the dummy inner conductors 26 could be earthed so as to cause a voltage drop if connected to a 'live' conductor 26; this voltage drop can be sensed and used to trigger an alarm.

It is envisaged that tampering with the main alarm system itself can be sensed by sensing means which detect certain changes in the voltage or current characteristics of the circuit, thereby sounding an alarm in the unlikely event that an intruder should succeed in making connections to the live inner conductors B without being caught.

It will be clear that the inner conductors 26 can be a mixture of types A and B, or B and C, or A, B and C. It is possible for wires 24, or even entire sensing elements 18 to be dummies or to be capable of sensing attempts to short-circuit the network by interconnection of sensing elements. There may be any number of wires 24 and they may contain any suitble number of inner conductors 26 having any number of tinsel-wire strands 30. It will be clear that the conductors 26 need not actually be conductive if they are dummies, it being more important that the dummy conductors are substantially indistinguishable from the live conductors.

A further feature of this invention is that an unauthorised intruder is deterred by having to cut through two layers of sheath material to gain access to each inner conductor; the sheath material may be reinforced to hamper access still further by acting as a barrier.

I claim:

1. An alarm system for protecting a flexible closure, comprising:
   a first alarm circuit at least partially defined by means of a first conductor;
   a second alarm circuit independent of said first circuit and at least partially defined by means of a second conductor;
   a common outer sheath, said first and second conductors being enclosed in said outer sheath; and
   at least one other dummy "conductor" of substantially identical appearance to said first and second conductors but which does not form part of any circuit, said dummy "conductor" also being enclosed in said common outer sheath;
   said common outer sheath and enclosed conductors defining a wire which is laid in a network over a surface of the flexible closure to be protected.

2. A system according to claim 1, characterised in that the second alarm circuit is for sensing and alerting against attempts to tamper with the wire (24).

3. A system according to claim 1, characterised in that the conductors (26A,26B,26C) are braided, twisted or platted together within said sheath (28).

4. A system according to claim 1, characterised in that the wire (24) is supported on a backing strip (20) which is adapted for attachment to the flexible closure (10,14).

5. An alarm system comprising:
   a first alarm circuit at least partially defined by means of a first conductor (26B);
   a second alarm circuit independent of said first circuit and at least partially defined by means of a second conductor (26C);
   characterized in that the alarm system is for protecting a flexible closure (10, 14), and in that the first and second conductors (26B, 26C) are enclosed in a common outer sheath (28) together with at least one other dummy "conductor" (26A) of substantially identical appearance to both said conductors (26B, 26C) but which does not form part of any circuit, to define a wire (24) which is laid in a network (16) over a surface of the flexible closure (10, 14) to be protected;
   at least one of said conductors (26A, 26B, 26C) being made up of a plurality of wires (30) twisted together.

* * * * *